United States Patent
Clothier

(10) Patent No.: US 9,212,955 B2
(45) Date of Patent: Dec. 15, 2015

(54) MICROWIRE TEMPERATURE SENSORS CONSTRUCTED TO ELIMINATE STRESS-RELATED TEMPERATURE MEASUREMENT INACCURACIES AND METHOD OF MANUFACTURING SAID SENSORS

(75) Inventor: Brian L. Clothier, Wichita, KS (US)

(73) Assignee: TSI Technologies LLC, Wichita, KS (US)

( * ) Notice: Subject to any disclaimer, the term of this patent is extended or adjusted under 35 U.S.C. 154(b) by 681 days.

(21) Appl. No.: 13/411,767

(22) Filed: Mar. 5, 2012

(65) Prior Publication Data

US 2012/0230365 A1 Sep. 13, 2012

Related U.S. Application Data

(60) Provisional application No. 61/464,682, filed on Mar. 9, 2011.

(51) Int. Cl.
*G01K 7/00* (2006.01)
*G01K 7/36* (2006.01)
(Continued)

(52) U.S. Cl.
CPC .. *G01K 7/36* (2013.01); *G01K 1/08* (2013.01); *G01K 15/005* (2013.01)

(58) Field of Classification Search
CPC . B82Y 10/00; Y10S 977/838; G01N 27/4146
USPC .......... 340/572.5, 572.1, 572.4, 584, 870.17; 422/26, 295, 119, 121, 125; 219/600, 219/494, 635, 9; 702/130, 99, 136; 324/219, 224, 225, 494, 226, 228, 244, 324/260, 263, 200, 201; 374/100, 101, 102, 374/103, 104, 105, 141, 1, 163–187
See application file for complete search history.

(56) References Cited

U.S. PATENT DOCUMENTS 3,819,420 A * 6/1974 Schmidt et al. ................ 136/228
6,208,253 B1 * 3/2001 Fletcher et al. ............... 340/584
(Continued)

FOREIGN PATENT DOCUMENTS

SU 832505 B * 5/1981
WO 2010151453 A2 12/2010

OTHER PUBLICATIONS

International Search Report and Written Opinion; International Application No. PCT/US2012/028058; International Filing Date Mar. 7, 2010.
(Continued)

*Primary Examiner* — Gail Kaplan Verbitsky
(74) *Attorney, Agent, or Firm* — Hovey Williams LLP

(57) ABSTRACT

Improved, highly accurate microwire sensors (10) include a microwire assembly (14) including at least one primary, temperature-sensing microwire (16) encased within a closed-ended, stress-absorbing protective tube (12). Preferably, the sensor assembly (14) includes a plurality of microwires, e.g., a primary temperature-sensing microwire (16), a reference microwire (18), and a calibration microwire (20). The sensors (10) may be embedded within a heat-treatable or curable material (24) to monitor the temperature of the material (24) over a selected temperature range, e.g., during a pre- and/or post-curing temperature range. The tube (12) is formed of material which does not appreciably magnetically bias the microwire assembly (14), and substantially prevents forces exerted on the tube (12) from distorting the sensor assembly (14).

16 Claims, 3 Drawing Sheets

(51) Int. Cl.
*G01K 15/00* (2006.01)
*G01K 1/08* (2006.01)

(56) References Cited

U.S. PATENT DOCUMENTS

| | | |
|---|---|---|
| 7,736,052 B2 | 6/2010 | Shumaker et al. |
| 7,794,142 B2 | 9/2010 | Clothier et al. |
| 8,485,723 B2 * | 7/2013 | Sorkine et al. ............... 374/163 |
| 2007/0263699 A1 | 11/2007 | Clothier et al. |
| 2008/0175753 A1 | 7/2008 | Clothier |
| 2009/0122829 A1 * | 5/2009 | Perez-Luna et al. .......... 374/102 |
| 2010/0006562 A1 | 1/2010 | Clothier |
| 2010/0322283 A1 | 12/2010 | Clothier et al. |
| 2011/0038395 A1 | 2/2011 | Sorkine et al. |

OTHER PUBLICATIONS

European Search Report dated Jan. 29, 2015; EP Application No. 12754370.0 (EP 2 684 014).

Zhukova V. et al. "Development of thin microwires with low Curie temperature for temperature sensor applications." Sensors and Acutators B 126 (2007) 318-323. Availableon line at www.sciencedirect.com.

* cited by examiner

MICROWIRE TEMPERATURE SENSORS CONSTRUCTED TO ELIMINATE STRESS-RELATED TEMPERATURE MEASUREMENT INACCURACIES AND METHOD OF MANUFACTURING SAID SENSORS

CROSS-RELATED APPLICATIONS

This application claims the benefit of provisional application Ser. No. 61/464,682, filed Mar. 9, 2011, incorporated herein by reference in its entirety.

BACKGROUND OF THE INVENTION

1. Field of the Invention

The present invention is broadly concerned with improved microwire temperature sensors which are specially designed to be partially or wholly embedded within a heat treatable or curable material, such as Carbon Fiber Reinforced Plastic (CFRP), other curable polymers, elastomers, rubber compounds, ceramic materials, cement, or concrete, in order to accurately sense the temperature of the material during the course of heat treatment (e.g., a pre- and/or post-curing temperature range). More particularly, the invention is concerned with such sensors which have at least one primary temperature-sensing microwire housed and encased within a substantially rigid, close-ended protective tube formed of a material which does not appreciably magnetically bias the re-magnetization responses of the microwire(s); in preferred forms, a plurality of microwires, including the primary temperature-sensing microwire and/or a calibration microwire and/or a reference microwire are positioned within the protective tube. The use of protective tubes isolates the microwires from stresses developed in the material during heating or curing thereof to provide more accurate temperature sensing. Furthermore, these protective tubes prevent the microwires from strain caused by the material's final post-cure dimensions being different than starting dimensions (for instance, due to shrinkage), where such strain can alter the re-magnetization responses of the microwire at any given temperature and thus cause inaccurate temperature measurements. Finally, these protective tubes isolate the microwires from stress during post-cure heating or cooling of the material due to expansions and contractions, thus allowing accurate temperature measurement of the material or part at any time post-cure.

2. Description of the Prior Art

U.S. Patent Publications Nos. 2007/0263699 entitled "Magnetic Element Temperature Sensors," 2008/0175753 entitled "Microwire-Controlled Autoclave and Method," and 2010/0322283 entitled "Magnetic Element Temperature Sensors" describe the general construction and operation of microwire temperature sensors and overall temperature-sensing apparatus used with such sensors. Broadly speaking, these microwire sensors include at least one temperature-sensing microwire comprising an amorphous or nanocrystalline metal alloy core in the form of an elongated wire or ribbon, with a glass sheath or coating surrounding the core (see FIG. 1 of the '753 publication). The metal alloy cores of such temperature-sensing microwires are carefully designed so that the microwires exhibit characteristic re-magnetization responses under the influence of an applied alternating magnetic field, and moreover have set point temperatures (usually the Curie temperature or any number of temperatures in a region below the Curie temperature) such that the re-magnetization responses of the microwires are significantly different below or above these temperatures. The re-magnetization responses are defined by at least one short, detectable pulse of magnetic field perturbation of defined duration. Once Curie temperature of the microwire is reached, the detected voltage of the response goes to zero or near-zero.

These prior microwire sensors are used in conjunction with detecting apparatus including a field-generating coil which generates an interrogating alternating magnetic field, and a detection coil, which detects the re-magnetization responses of the interrogated microwires. These responses are then decoded using a signal processor to generate an output representing the temperature experienced by the sensors. Hence, the temperature experienced by a heat curable material having a microwire sensor embedded therein can be monitored. Furthermore, this temperature information can be used to control the heating process.

While the utility of known microwire temperature sensors and related detection apparatus has been established, certain problems have been encountered when the prior art sensors have been permanently embedded within uncured, layered CFRP composite materials, such as those used in the fabrication of aerospace parts, followed by heat treatment in an oven or autoclave to cure the composite. The goal was to remotely and wirelessly detect the temperature of the interior of the composite object during the curing process, so that the temperature information could be used by a controller to adjust the oven/autoclave temperatures and/or elapsed curing time at the various temperatures, to yield a more effective and efficient curing cycle.

However, in actual practice it was found that the embedded prior art sensors did not provide completely reliable temperature sensing, when comparatively tested using embedded Type E thermocouples. The sensed temperature profile from the prior art sensors was, in certain instances, significantly different from that derived using the thermocouples.

There is accordingly a need in the art for improved microwire sensors which can be at least in part embedded within heat-curable materials, such as CFRP composites or other materials to give accurate temperature data during the heat curing process or exotherm process, as well as during service thereafter.

SUMMARY OF THE INVENTION

The present invention overcomes the problems outlined above and provides improved, embeddable temperature sensors which give highly accurate temperature information during the course of heat curing or curing of materials such as CFRP composites, other curable polymers, elastomers, rubber compounds, ceramic materials, cement, or concrete. Furthermore, these sensors allow for highly accurate temperature information at any time after cure because they prevent stress-inducted inaccuracies caused permanently in prior art sensors by the curing process.

A detailed study of the operation of prior art microwire sensors embedded in CFRP composites revealed that stresses were imposed upon the embedded sensors owing to changes in viscosity (and related expansion/contraction behavior) of the CFRP composites surrounding the microwire sensor during the curing process. These stresses resulted in random temperature inaccuracies reported by the sensors. It is believed that the stresses exerted upon the embedded sensors changed the functional relationship between the normalized values derived from the primary and reference microwires, resulting in random inaccuracies in deduced temperatures. Inasmuch as it is virtually impossible to predict changes in the viscosity (and related expansion/contraction behavior) of CFRP resins from process-to-process or when using different resins, the prior art sensors could not provide accurate temperature profiles under these circumstances.

Furthermore, it has been found that there is a need to study the temperature within CFRP composite parts and other cured parts such as automobile tires, shower stalls, cement/concrete structures, and many others. Since it is impossible to account for the various stresses and strains that each individual cured part will impart to non-shielded temperature-sensing microwires due not only to shrinkage during cure but also due to expansion/contraction in operational use at various operational temperatures, isolation from such unknown stresses and strains is important for a sensor capable of general use in myriad materials, products, and product applications.

FIG. 1 is a representative test result from an autoclave curing test wherein a prior art dual-microwire sensor (comprising a primary temperature-sensing microwire and a reference microwire) was embedded within the layers of a CFRP panel followed by curing involving raising the ambient temperature within the autoclave in a predetermined fashion. In the test, a Type E thermocouple was also embedded within the CFRP material directly adjacent and within the same layer as the embedded prior art microwire sensor. The deduced temperature profile using the embedded microwire sensor was then compared with the thermocouple-derived data.

Referring to FIG. 1, the curve labeled "TC004" represented the thermocouple-derived profile, which was assumed to be accurate. The curve labeled "Channel 4" represented the deduced temperature profile from the prior art microwire sensor. Note the random periods of inaccuracy using the microwire sensor, especially during the early portion of the curing cycle where the reported thermocouple temperature was below 350° F. (run time less than 140 minutes). The generally flat portion of the TC004 curve at about 390° F. is due to the fact that the Curie temperature of the primary microwire sensor was reached.

In order to overcome these problems, the invention provides an improved material temperature sensor comprising an outer, close-ended tube and a sensor assembly within the tube. The sensor assembly includes at least one elongated, magnetically susceptible temperature-sensing primary microwire having a re-magnetization response under the influence of an applied alternating magnetic field and operable to sense the temperature of the material over a selected temperature range. The primary microwire re-magnetization response is defined by at least one short, detectable pulse of magnetic field perturbation of defined duration and different above and below a primary microwire set point temperature, where the primary microwire set point temperature is at or below the Curie temperature of the primary microwire. In one preferred embodiment, the sensor is designed to be placed at least partially within a heat-curable material in order to accurately sense the temperature of said material during curing thereof over a curing temperature range.

The protective tube is formed of a material which does not appreciably magnetically bias the primary microwire, such that the presence of the tube does not significantly alter the re-magnetization responses of the primary microwire and any of the secondary microwires which are present. The tube is operable to substantially prevent forces exerted on the tube by the material during curing thereof from distorting the sensor assembly within the tube.

The preferred sensor assembly further includes an elongated, magnetically susceptible temperature-sensing secondary microwire having a re-magnetization response different than the re-magnetization response of the primary microwire under the influence of the applied alternating magnetic field and operable to sense the temperature of the material over at least a portion of the selected temperature range. The secondary microwire re-magnetization response is defined by at least one short, detectable pulse of magnetic field perturbation of defined duration and different above and below a secondary microwire set point temperature, where the secondary microwire set point temperature is less than or equal to the set point temperature of said primary microwire.

In preferred forms, the microwire assembly further includes an elongated, magnetically susceptible reference microwire having a re-magnetization response under the influence of the applied alternating magnetic field which is defined by at least one short, detectable pulse of magnetic field perturbation of defined duration. The re-magnetization response of the reference microwire is substantially constant throughout the selected temperature range.

Multiple-microwire assemblies are advantageously fabricated by adhering together the respective microwires to form a bundle. This assures that the relative orientation of the microwires is maintained. Any convenient adhesive material can be used to create the bundle assembly, such as a silicone adhesive. It is also preferred to coat the adhered bundle assembly with a layer of lubrication, particularly a dry lubricant. This ensures that the complete bundle assembly can move freely within the protective tube.

In another preferred temperature sensor comprising a primary temperature-sensing microwire and a reference microwire, the primary microwire of the sensor can be normalized to render the sensor insensitive to variations in the distance between the sensor and detector (i.e., where said variation can change the integrated area of each individual microwire's detected voltage pulse). In such a sensor, the integral over time of the primary microwire detected voltage pulse at any given temperature within the selected temperature range has a first magnitude, and the corresponding integral over time of the reference microwire detected voltage pulse is a second magnitude. Using these magnitudes, a quotient value may be obtained, which is used with appropriate decoding to determine the temperature of the material during heat-treating or curing.

DETAILED DESCRIPTION OF THE PREFERRED EMBODIMENT

Figure 1:
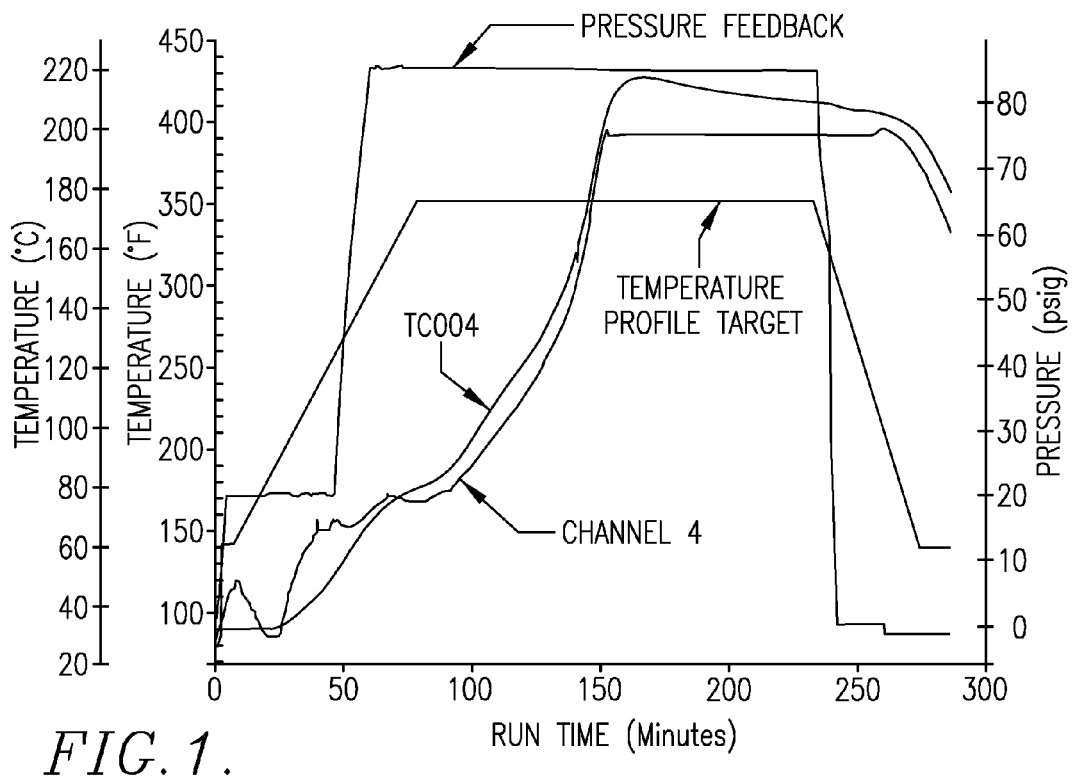
FIG. 1 is a representative graph of an autoclave test wherein a prior art two-microwire temperature sensor is embedded within a composite CFRP panel adjacent to a Type E thermocouple, to illustrate the temperature inaccuracies of the prior art sensor in this context.

Turning now to the drawings, the improved, stress-resistant sensors 10 of the invention are broadly made up of an outer, close-ended, protective tube 12 housing a microwire assembly 14. The assembly 14 comprises at least one primary temperature-sensing microwire 16, and advantageously at least one, and more preferably two, additional, different microwires, with each of the additional microwires performing a separate function. Specifically, the additional microwires comprise a reference microwire 18 and/or a calibration microwire 20. Thus, each assembly 14 always includes a primary temperature-sensing microwire 16, and preferably either a reference microwire 18, or a calibration microwire 20, or both.

The microwires 16, 18, and 20 are all formed of amorphous or nanocrystalline metal, and are preferably glass-coated. The different functions of the respective microwires, explained more fully below, are obtained by appropriate selection of the alloys used in the fabrication of the microwires. The microwires 16, 18, and 20 are of the general type and configuration of the microwires described in the aforementioned U.S. Patent Publications Nos. 2007/0263699, 2008/0175753, and 2010/0322283, all of which are incorporated by reference herein in their entireties.

Figure 5:
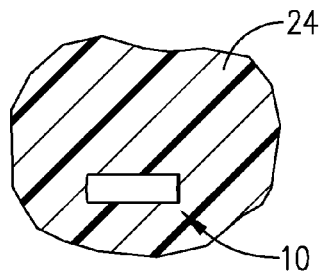
FIG. 5 is a fragmentary view illustrating a sensor in accordance with the invention embedded with a heat curable material.
Figure 6:
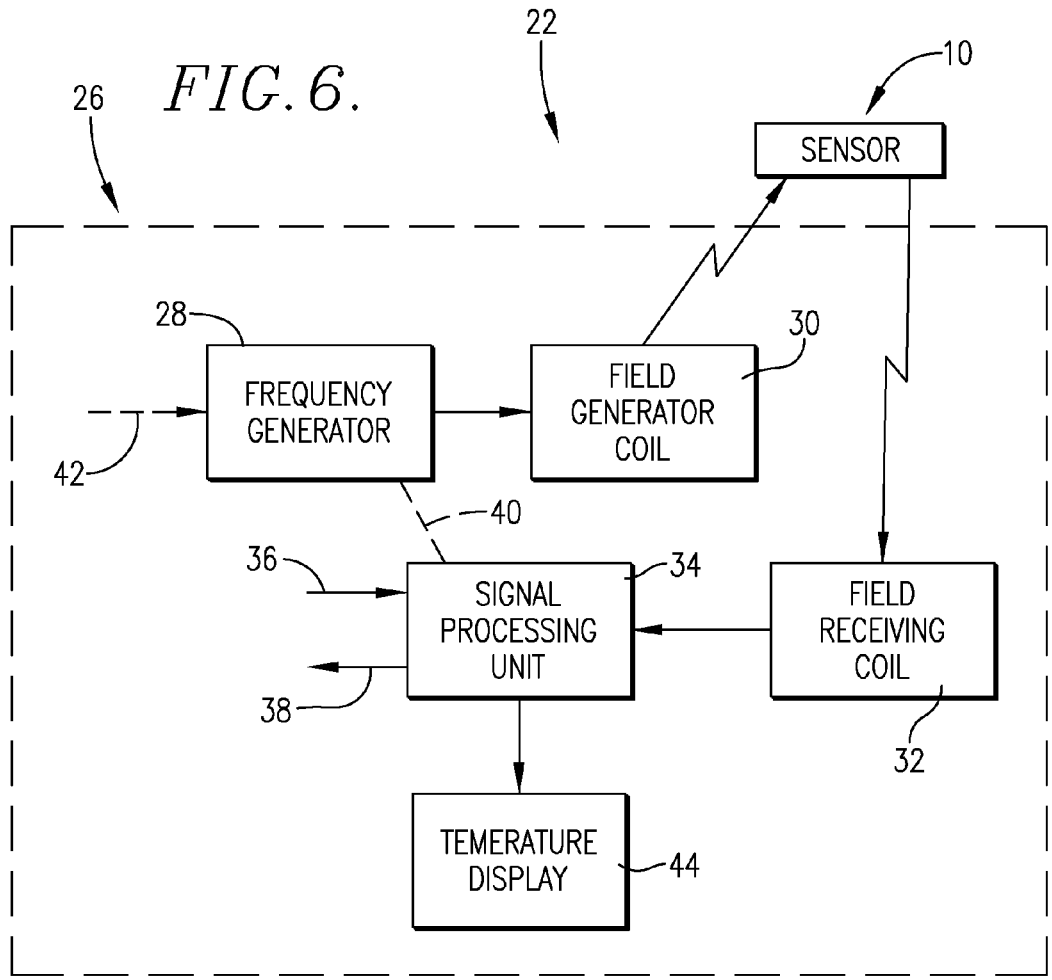
FIG. 6 is a schematic block diagram of an overall temperature sensing system making use of the improved sensor of the invention.

The sensors 10 in accordance with the invention are typically used within an overall wireless temperature-sensing system 22 (FIG. 6). FIG. 5 illustrates a sensor 10 fully embedded within a heat treatable or curable material 24. The field generator coil 30 and field receiving coil 32 of the apparatus illustrated in FIG. 6 are placed in proximity to the material 24 and embedded sensor 10. The system 22 thus includes the sensor 10, as well as a detector device 26. The device 26 has an alternating magnetic field transmitter unit in the form of a frequency generator 28 coupled with a field generator coil 30, such that the transmitter unit is operable to create an alternating magnetic field for interrogating sensor 10 within material 24. The device 26 further includes a field receiving coil 32 operably coupled with a signal processing unit 34 equipped with communication ports 36 and 38, and may be operably coupled with frequency generator 28 via connection 40. Additionally, frequency generator 28 may be equipped with an optional input 42 permitting remote control of the generator 28. An optional temperature display 44 may also be coupled with processing unit 34.

The signal processing unit 34 operates using a decoding algorithm having the capability to decode the magnetic field perturbation information received upon interrogating the sensor 10. The decoded information may then be displayed on display 44 and/or used as a part of a feedback loop to control any external device in communication with detector device 26. The decoding algorithm may be in the form of one or more look-up tables, or a temperature-calculating algorithm without lookup table information.

Protective Tube 12

The protective tube 12 is formed of any material having sufficient structural integrity to protect the internal microwire assembly 14, and which has a near-zero or zero magnetization. It is important that the tube 12 not magnetically bias the microwires forming the assembly 14, so as not to alter the re-magnetization responses thereof during temperature sensing. Suitable materials for the tube 12 include paramagnetic metals, metal alloys having near-zero or zero magnetization, glasses, ceramics, and high-temperature synthetic resin polymers. The most preferred material used in fabricating the tube 12 is nitinol metal (NiTi), which is a superelastic shape memory alloy that is commercially available in tube form from the Memry Corporation as Alloy BB tube. This material is preferred because it is resistant to kinking and further resists changes in its shape. The depicted tube 12 of the drawings was formed of nitinol tubing BB (Product No. DM5408) with an inner diameter of 0.007 inches and an outer diameter of 0.010 inches. The protective tube preferably has a length of from about 20-45 mm, more preferably from about 25-35 mm, and most preferably about 32 mm. After the microwire assembly 14 is positioned within the cut tube, the ends thereof are closed by crimping, soldering, brazing, gluing, or laser sealing; the manner of tube closure is not significant so long as a sufficient seal is provided to prevent entrance of foreign material into the interior of the protective tube.

In preferred forms, the inner diameter and length of the tube 14 should be sufficient to allow free movement of the microwire assembly 14 therein, allowing the latter to slide and laterally move to a limited extent. This assures that any external forces experienced by the tube 12 are not transferred to the inner microwire assembly 14.

Primary Temperature-Sensing Microwire 16

The function of the microwire 16 is to provide a magnetically susceptible, temperature-sensitive re-magnetization response under the influence of an applied alternating magnetic field over at least a part of the range of temperatures desired to be measured by the temperature sensor, and preferably substantially throughout the entire temperature range. This response is defined by at least one short, detectable pulse of magnetic field perturbation of defined duration and is different above and below the set point temperature (typically the Curie temperature) of the microwire sensor 16. These responses are normally detectable as sharp voltage pulses by the detecting antenna and its associated detector device. The detected voltage pulses are caused by the re-magnetization (rapid change of magnetic polarity from one bi-stable magnetic polarization to the other) of the microwire as it is interrogated by the external alternating magnetic field. Detectable parameters of the detected voltage pulses, such as the peak voltage amplitude, pulse shape, and duration, change with the temperature of the microwire 16 (these same detection phenomena also apply to the other microwires disclosed herein). Usually, the microwire 16 will function over temperatures from below room temperature up to the Curie temperature of the microwire 16 (usually less than 400° C.). Where the sensor 16 is used to detect temperatures during heat treatment (e.g., heat curing) of a material, the range of temperature would be the corresponding temperature range, or a portion of the range of special interest.

Throughout the selected temperature range for a given primary microwire 16, the re-magnetization response of the latter changes its shape when plotted as a detected response pulse voltage versus time. Moreover, the integrated area of the re-magnetization pulse decreases gradually and in a predictable, repeatable, and calibratable manner as the temperature experienced by the microwire 16 increases, such that at any given temperature, the calculated integrated area gives a magnitude value. When the temperature experienced by the microwire 16 reaches or exceeds the Curie temperature thereof, there is no longer any detectable voltage pulse, and thus the magnitude value goes to zero or near-zero. Generally, the microwire 16 has a greater measurement sensitivity (larger change in magnitude value per degree of temperature change) throughout a short temperature range (e.g., 40-60° C.) below the Curie temperature thereof, and has a lesser measurement sensitivity below this short temperature range.

Preferred microwires 16 are in the form of elongated amorphous or nanocrystalline metal alloy wires or ribbons 46 having a glass sheath or coating 48 along the entire length thereof. The microwires 16 have a length less than the length of the protective tube 14, and preferably from about 20-30 mm, more preferably about 28 mm; the diameter of the microwire 16 would preferably be up to about 100 micrometers. The selected alloy for the microwire 16 (and also for the other microwires 18 and 20) is preferably Fe- or Co-based and contain Cr, with adjustments in the atomic percentage of Cr serving to provide the requisite magnetic properties desired. For example, in iron-based (Fe80-x Cr-x) (PC) 20 alloys, the amount of chromium has a sizeable effect on the magnetic properties thereof. An increase in Cr lowers the Curie temperatures, the average hyperfine fields, and the saturation magnetizations of the microwires. Other chemical changed in Fe-based and Co-based alloys may also be utilized to alter the magnetic characteristics of the microwires. For example, Co can be substituted for Fe in certain FCZBN alloys, and resulting Curie temperatures exhibit a sinusoidal-like behavior with increasing Co content. Co—P amorphous alloys with high P content can be electrolytically obtained. The Curie temperatures of these alloys exhibit a linear behavior in Curie temperature versus composition up to 28-29% P, and for higher P concentrations, a constant Curie temperature is obtained. These sorts of alloy modifications serving to alter microwire re-magnetization properties in predictable ways are well known to those skilled in the art.

While the depicted embodiments of the present invention make use of only a single primary temperature-sensitive microwire 16, if desired a plurality of such microwires may be used. In such instances, at least certain of the temperature-sensing microwires 16 have different set point or Curie temperatures as compared with other of the temperature-sensing microwires. By selecting the different set point temperatures for the microwires 16, it is possible to provide sensors with enhanced sensitivities.

Reference Microwire 18

The reference microwire 18 is similar to primary microwire 16 in shape, diameter, and length, and is also fabricated as a glass-coated amorphous or nanocrystalline metal alloy, thus presenting a wire or ribbon 50 and a glass coating 52. The difference between reference microwire 18 and primary microwire 16 resides in the magnetic properties thereof, which result from use of a different alloy as compared with the primary microwire 16.

The re-magnetization response of the reference microwire 18 remains substantially constant throughout some or all of the desired temperature range chosen for the primary microwire 16, i.e., its detected voltage vs. time response throughout this range is substantially the same, assuming that the distance between sensor 10 and coil 32 remains constant. Thus, reference microwire 18 is not designed as a temperature-sensing microwire. Nonetheless, just as in the case of the primary microwire 16, the reference microwire 18 has a characteristic re-magnetization response under the influence of an applied alternating magnetic field, in the form of at least one short, detectable pulse of magnetic field perturbation of defined duration. However, unlike the primary microwire 16, the re-magnetization response of the reference microwire 18 is substantially constant over at least a part of the primary microwire operational temperature range, and preferably over the entire temperature range.

In the event that the distance between sensor 10 and coil 32 is changed, the corresponding re-magnetization responses of the primary and reference microwires will change, along with the respective integrated areas of their re-magnetization voltage pulses. This can lead to erroneous temperature sensing if the signal processing unit 34 uses only the primary microwire's integrated area (or derived value) to calculate the sensor temperature. However, the responses of the microwires 16 and 18 will vary in a proportionately constant fashion, i.e., the re-magnetization responses of the microwires 16 and 18 will vary in tandem. Accordingly, the primary microwire 16 may be normalized (by employing the integrated area of the reference microwire 18 as a divisor) to render it substantially insensitive to changes in distance between it and the coil 32. This in turn allows the sensor 10 to report accurate temperatures notwithstanding such changes. Normalization is preferably achieved by calculating a quotient value using the quotient of the integrated magnitude values for the primary and reference microwires 16 and 18, respectively, and using this quotient value in part to determine the actual temperature experienced by the sensor 10. The quotient value is preferably determined by dividing the integrated area of the primary microwire response at each interrogation interval, by the integrated area of the reference microwire response at each such interval. However, other quotient values could be devised, such as by reversing the numerator and denominator of the preferred technique. Using such a normalization scheme ensures that the quotient value for each temperature within the range remains substantially constant notwithstanding spacing differences between the sensor 10 and coil 32.

Calibration Microwire 20

The calibration microwire 20 is again similar to primary microwire 16 in shape, diameter, and length, having an elongated amorphous or nanocrystalline metal alloy wire or ribbon 54 and a surrounding glass coating 56. The microwire 20 has a Curie temperature less than or equal to the set point temperature of the primary microwire 16; preferably, the set Curie temperature is significantly lower than that of the primary microwire 16. The calibration microwire 20 also has a characteristic re-magnetization response under the influence of an applied alternating magnetic field in the form of at least one short, detectable pulse of magnetic field perturbation of defined duration above and below its set point temperature.

It will thus be appreciated that the calibration microwire 20 is itself a temperature-sensing microwire, but that, in preferred forms, the Curie temperature thereof is substantially below the set point or Curie temperature of the primary microwire 16. The calibration microwire 20 can thus act as a calibration element for the primary microwire 16. When the Curie temperature of the calibration microwire 20 is reached, it ceases to generate any significant re-magnetization response. Given the fact that the Curie temperature of the calibration microwire 20 is known, when the re-magnetization response of the calibration microwire 20 ceases, it is certain that the temperature experienced by the sensor 10 is at that known temperature. Therefore, the temperature output information derived from the primary microwire 16 can be adjusted as necessary using the signal processor 34 and the appropriate algorithm. Additionally, in light of the fact that the temperature sensitivity of the calibration microwire 20 is most sensitive during a short temperature range below its Curie temperature, the rapidly changing integrated area of the calibration microwire 20 can be used to enhance the temperature sensitivity of the sensor 10 during this short temperature range.

Microwire Assembly 14

Figure 2:
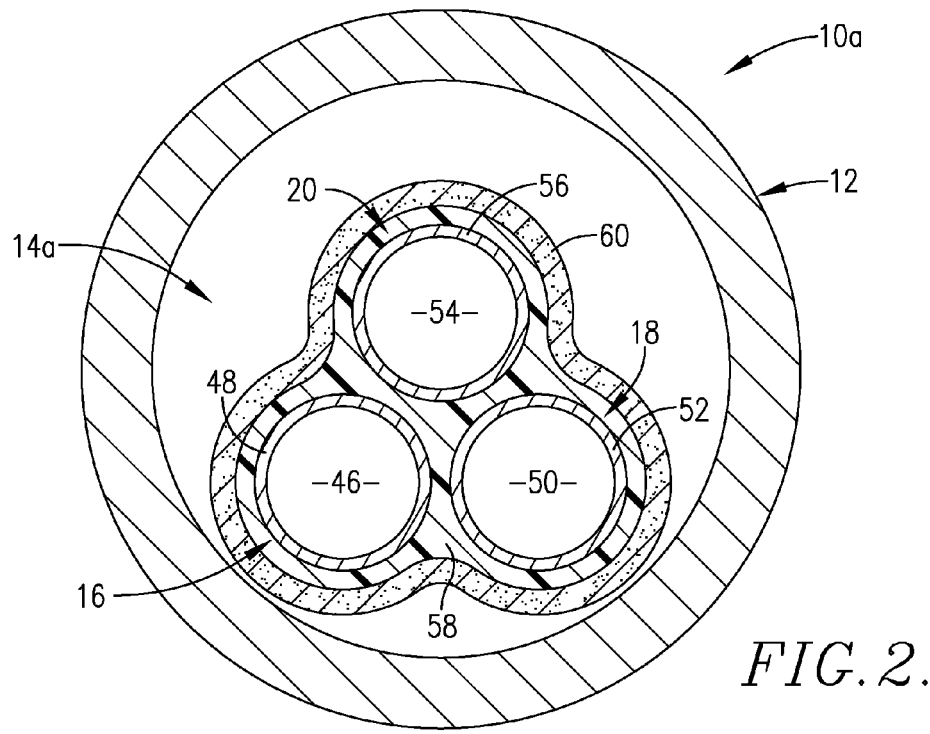
FIG. 2 is an enlarged, vertical sectional view depicting a preferred three-microwire temperature sensor in accordance with the invention.
Figure 3:
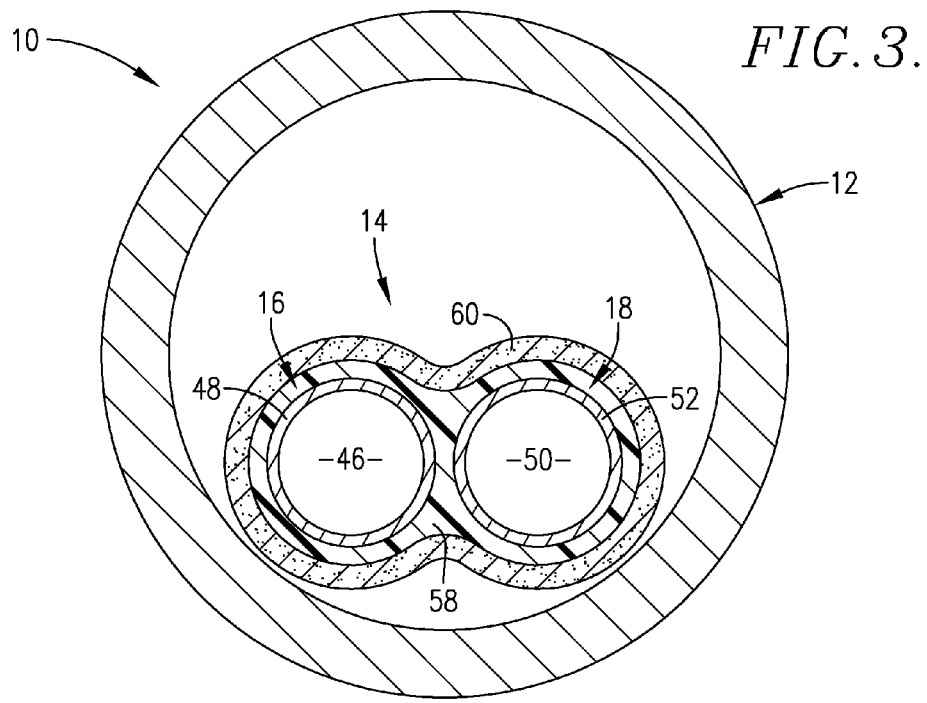
FIG. 3 is an enlarged, vertical sectional view depicting a two-microwire temperature sensor in accordance with the invention.

FIG. 3 illustrates a two-microwire assembly 14 comprising a primary microwire 16 and a reference microwire 18, whereas FIG. 2 depicts the preferred three-microwire assembly 14a comprising microwire 16, a reference microwire 18, and calibration microwire 20. In each case, the assembly 14 or 14a is housed within protective tube 12, to thereby provide a dual-microwire sensor 10 (FIG. 3), or a three-microwire sensor 10a (FIG. 2).

In either case of the assembly 14 or 14a, it is preferable that the microwires thereof are permanently joined together using a flexible high temperature adhesive 58 to thereby create a "bundle" of the microwires. The adhesive 58 is preferably a silicone adhesive, such as Momentive RTV 116 Flowable Silicone adhesive; however, other adhesives could also be employed. In preferred practice, the adhesive 58 is applied sparingly, such that a minimum film of adhesive is disposed about each of the microwires. Before the adhesive 58 has cured, it is preferred to apply a dry lubricant 60 to the outer surface of the adhesive 58. The dry lubricant 60 preferably has a very small particle size so that application thereof does not appreciably increase the cross-sectional size of the assembly. The dry lubricant 60 can be any of a number of known dry lubricant powders which are commercially available, e.g., graphite powder (preferably 325 mesh or finer), hexagonal boron nitride powder preferably having less than 5 micron diameter particles such as that available from Momentive Performance Materials, or Dow Corning's Molykote® molybdenum disulfide powder. In fabrication procedures, the wet silicone adhesive-coated assembly is dredged into an excess of selected dry lubricant powder until the entire length of the wet surface is coated with the dry lubricant. Once the assembly 14 is fully coated with dry lubricant, it is then cured in an oven to the adhesive manufacturer's specified curing temperature (e.g., 450° F. for one hour). At this point, the assembly 14 of 14a is ready for insertion into the protective tube 12, followed by closure of the tube ends, as previously described.

Preferably, the overall diameter of the microwire assembly 14 or 14a is minimized so as to permit free movement of the assembly 14 or 14a within the tube 12. In the case of the three-microwire assembly 14a, the effective diameter does not exceed 85 micrometers. As such, there is considerable free volume within the tube 12, thereby allowing the assembly 14a to move freely within the tube 12.

Temperature Sensing Using the Sensors of the Invention

Figure 4:
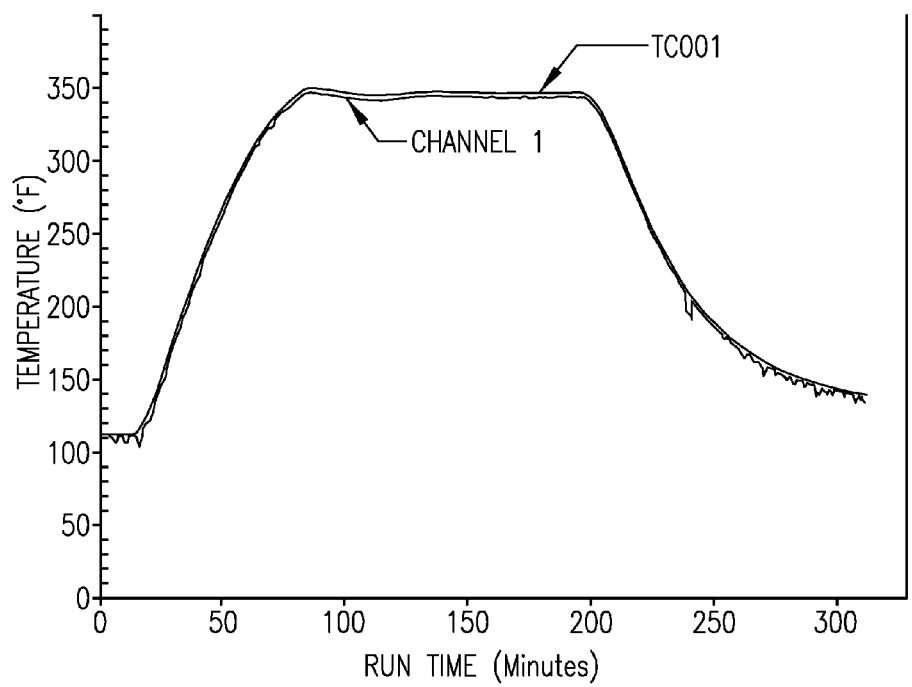
FIG. 4 is a representative graph of an autoclave test wherein a two-microwire temperature sensor in accordance with the invention was embedded with a composite CFRP panel adjacent a Type E thermocouple, to illustrate the temperature-sensing accuracy of the microwire sensor, even under the induced stresses occurring during curing of the CFRP panel.

FIG. 4 is a graphical representation of a test conducted in a manner similar to that of the depicted in FIG. 1, using the improved sensors 10 of the invention. Specifically, a two-microwire temperature sensor 10 having a microwire assembly 14 coated with molydenum disulfide powder dry lubricant and encased within a nitinol tube 12 was comparatively tested against a Type E thermocouple. The sensor 10 and thermocouple were embedded within the same layer of a CFRP composite panel, and the panel was then conventionally heat-cured. During curing, the temperature data derived from the sensor 10 and the thermocouple was collected. The curve labeled "TC001" was the thermocouple-derived data, whereas the "Channel 1" curve was the deduced temperature data from the sensor 10. A close review of FIG. 4 confirms that the microwire sensor gave essentially identical temperature data as compared with the thermocouple.

I claim:

1. A temperature sensor for sensing a temperature of a material of an object of interest, comprising:
  an outer, close-ended tube; and
  a sensor assembly within said tube including—
    an elongated, magnetically susceptible temperature-sensing primary microwire having a re-magnetization response under the influence of an applied alternating magnetic field and operable to sense the temperature of said material of the object of interest over a selected temperature range, said primary microwire re-magnetization response being defined by at least one short, detectable pulse of magnetic field perturbation of defined duration and different above and below a primary microwire set point temperature, said primary microwire set point temperature being at or below the Curie temperature of the primary microwire;
    an elongated, magnetically susceptible temperature-sensing secondary microwire having a re-magnetization response different than the re-magnetization response of said primary microwire under the influence of said applied alternating magnetic field and operable to sense the temperature of said material over at least a portion of said selected temperature range, said secondary microwire re-magnetization response being defined by at least one short, detectable pulse of magnetic field perturbation of defined duration and different above and below a secondary microwire set point temperature, where the secondary microwire Curie temperature is less than or equal to the Curie temperature of said primary microwire,
  said tube formed of a material which does not appreciably magnetically bias said primary microwire, such that the presence of said tube does not significantly alter the re-magnetization responses of said primary and secondary microwires,
  said tube operable to substantially prevent forces exerted on the tube by said material from distorting said sensor assembly within said tube.

2. The temperature sensor of claim 1, said primary and secondary microwires being adhered together to form a microwire bundle, said bundle operable to maintain the relative positions of the primary and secondary microwires within said tube.

3. The temperature sensor of claim 2, including a layer of lubrication covering the outer surfaces of said microwire bundle.

4. The temperature sensor of claim 3, said lubrication being a dry lubricant.

5. The temperature sensor of claim 1, said sensor assembly including an elongated, magnetically susceptible reference microwire having a re-magnetization response under the influence of said applied alternating magnetic field which is defined by at least one short, detectable pulse of magnetic field perturbation of defined duration, said re-magnetization response of said reference microwire being substantially constant throughout said selected temperature range.

6. The temperature sensor of claim 5, said primary, secondary, and reference microwires being adhered together to form a microwire bundle, said bundle operable to maintain the relative positions of the primary, secondary, and reference microwires within said tube.

7. The temperature sensor of claim 6, including a layer of lubrication covering the outer surfaces of said microwire bundle.

8. The temperature sensor of claim 7, said lubrication being a dry lubricant.

9. The temperature sensor of claim 1, said tube being sized to have an internal volume greater than the volume of said sensor assembly, whereby said sensor assembly is free to move to a limited extent within the tube.

10. The temperature sensor of claim 1, said tube formed of synthetic resin material.

11. A temperature sensor for sensing a temperature of a material of an object of interest, comprising:
  an outer, close-ended tube; and
  a sensor assembly within said tube including— an elongated, magnetically susceptible temperature-sensing primary microwire having a re-magnetization response under the influence of an applied alternating magnetic field and operable to sense the temperature of said material of the object of interest over a selected temperature range, said primary microwire re-magnetization response being defined by at least one short, detectable pulse of magnetic field perturbation of defined duration and different above and below a primary microwire set point temperature, where said primary microwire pulse is detectable as a voltage pulse, said primary microwire set point temperature being at or below the Curie temperature of the primary microwire, wherein the integral over time of said primary microwire detected voltage pulse at any given material temperature within said selected temperature range has a first magnitude;

an elongated, magnetically susceptible reference microwire having a re-magnetization response different than the re-magnetization response of said primary microwire under the influence of said applied alternating magnetic field, said reference microwire re-magnetization response being defined by at least one short, detectable pulse of magnetic field perturbation of defined duration, where said reference microwire pulse is detectable as a voltage pulse, said microwire re-magnetization response being substantially constant throughout said temperature range, wherein the integral over time of said reference microwire detected voltage pulse at said given material temperature has a second magnitude, wherein the quotient of said first and second magnitudes provides a quotient value which is used in part to determine the temperature of said material, said tube formed of a material which does not appreciably magnetically bias said primary microwire, such that the presence of said tube does not significantly alter the re-magnetization responses of said primary and reference microwires, said tube operable to substantially prevent forces exerted on the tube by said material from distorting said sensor assembly within said tube.

12. The temperature sensor of claim 11, said primary and reference microwires being adhered together to form a microwire bundle, said bundle operable to maintain the relative positions of the primary and reference microwires within said tube.

13. The temperature sensor of claim 12, including a layer of lubrication covering the outer surfaces of said microwire bundle.

14. The temperature sensor of claim 13, said lubrication being a dry lubricant.

15. The temperature sensor of claim 11, said tube being sized to have an internal volume greater than the volume of said sensor assembly, whereby said sensor assembly is free to move to a limited extent within the tube.

16. The temperature of claim 11, said tube formed of synthetic resin material.

* * * * *